(12) United States Patent
    Carlson

(10) Patent No.: US 9,166,709 B2
(45) Date of Patent: Oct. 20, 2015

(54) AMBIENT SIGNAL IDENTIFICATION

(75) Inventor: Ryan Lee Carlson, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 801 days.

(21) Appl. No.: 13/325,753

(22) Filed: Dec. 14, 2011

(65) Prior Publication Data

US 2013/0158935 A1    Jun. 20, 2013

(51) Int. Cl.
    H04B 17/21    (2015.01)
    H04B 17/345   (2015.01)

(52) U.S. Cl.
    CPC .............. *H04B 17/21* (2015.01); *H04B 17/345* (2015.01)

(58) Field of Classification Search
    CPC ............................. H04B 17/21; H04B 17/345
    USPC ................................................ 702/191, 195
    See application file for complete search history.

(56) References Cited

U.S. PATENT DOCUMENTS

| | | | | |
|---|---|---|---|---|
| 5,146,414 | A * | 9/1992 | McKown et al. ................ | 702/49 |
| 6,603,734 | B1 * | 8/2003 | Oksanen ........................ | 370/203 |
| 2010/0014571 | A1 * | 1/2010 | Horton et al. .................. | 375/227 |
| 2011/0255880 | A1 * | 10/2011 | Andres et al. .................. | 398/208 |
| 2012/0166107 | A1 * | 6/2012 | Gerritsen et al. ............... | 702/45 |

FOREIGN PATENT DOCUMENTS

| | | |
|---|---|---|
| EP | 2146441 A2 | 1/2010 |
| WO | WO2004074862 A2 | 9/2004 |

OTHER PUBLICATIONS

Chapter 12, "Examining Distributions", pp. 175-191, SAS Institute Inc., SAS/ INSIGHT User's Guide, Version 8, Cary, NC: SAS Institute Inc., 1999. 752 pp.*
EP search report dated Apr. 5, 2013 regarding application 12197090.9-1855, reference P56339EP, applicant The Boeing Company, 7 pages.
Nguyen et al., "Portable Wireless Device Threat Assessment for Aircraft Navigation Radios," 2004 International Symposium on Electromagnetic Compatibility, vol. 3, Aug. 2004, pp. 809-814.
Nguyen et al., "Small Aircraft RF Interference Path Loss", IEEE Symposium on Electromagnetic Compatibility, EMC 2007, Jul. 2007, pp. 1-6.

* cited by examiner

*Primary Examiner* — Alexander Satanovsky
(74) *Attorney, Agent, or Firm* — Yee & Associates, P.C.

(57) ABSTRACT

A method and apparatus for identifying ambient signal data in a test signal data set. A cumulative amplitude distribution of data elements is identified in the test signal data set in order by amplitude values. The data elements comprise frequency values and corresponding amplitude values. A subset of data elements from the test signal data set is identified. The subset of data elements comprises the data elements with the amplitude values greater than a first threshold value. The data elements in the subset of data elements are identified wherein a difference between the amplitude values of adjacent data elements in the cumulative amplitude distribution of data elements is greater than a second threshold value.

17 Claims, 6 Drawing Sheets

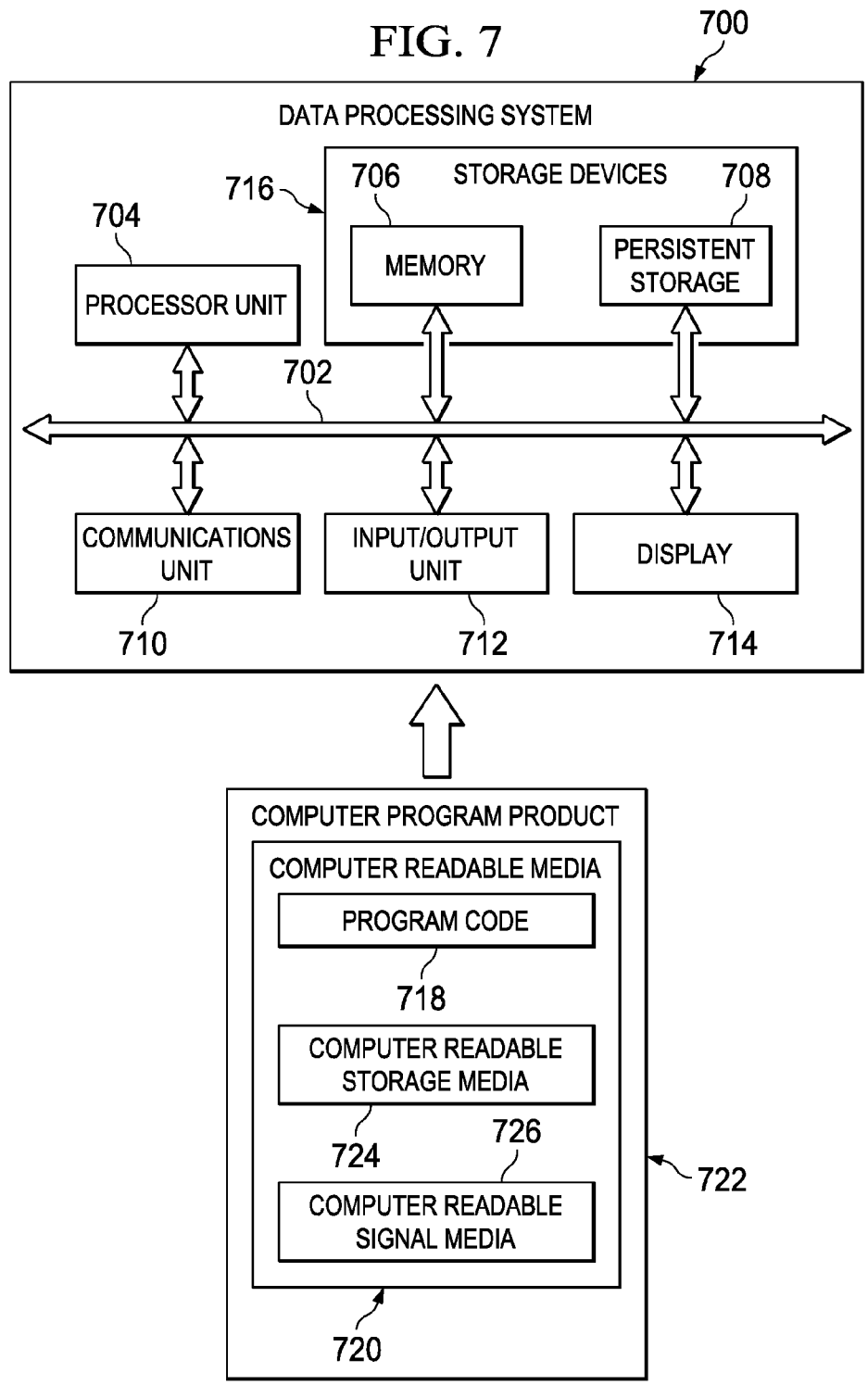

AMBIENT SIGNAL IDENTIFICATION

BACKGROUND INFORMATION

1. Field

The present disclosure relates generally to signal processing and analysis. Still more particularly, the present disclosure relates to identifying undesired signals resulting from ambient emissions in desired test signal data.

2. Background

Interference to aircraft radio receivers is an increasing concern as more portable electronic devices are allowed on-board aircraft for use by passengers and crew in a cabin of the aircraft. To reduce this concern, potential interference signals may be attenuated as they propagate from electronic devices inside the aircraft cabin to aircraft radio antennas mounted on the outside of the aircraft. The level of this attenuation level may be referred to as an interference path loss value.

Interference path loss measurements may be performed on aircraft to determine whether the attenuation of signals between electronic devices in the cabin and the aircraft radio receivers is sufficient. Such measurements may be made, for example, by transmitting a test signal from within the cabin and analyzing the resulting test signal data received by the aircraft radio receivers.

The accuracy of such interference path loss measurements may be affected by ambient radio frequency emissions in the area where the measurements are made. For example, such ambient emissions may include terrestrial radio frequency communications in the area where the interference path loss measurements are made.

Ambient emissions may affect any test or measurement in which a test signal is intentionally transmitted from a transmitter and a resulting test signal received by a receiver is analyzed. In any such test, signals from ambient emissions may be received by the receiver along with the intentionally transmitted test signal. In this case, the ambient emissions may mask the test signal generated by the transmitter. The test signal data received by the receiver may include data resulting from received ambient emissions, thereby affecting the analysis of the test signal data in undesired ways. Therefore, a reliable analysis of the received test signal data set may not be made if the test is performed in the presence of ambient emissions.

The effect of ambient emissions on interference path loss measurements and other tests involving transmitting and receiving a test signal may be reduced by conducting the tests or other measurements in an area where ambient emissions are known to be at a reduced level. However, conducting such measurements or other tests under such controlled conditions may be expensive, inconvenient, time-consuming, or impractical in many cases.

Accordingly, it would be desirable to have a method and apparatus that takes into account one or more the issues discussed above, as well as possibly other issues.

SUMMARY

An illustrative embodiment of the present disclosure provides a method for identifying ambient signal data in a test signal data set. A cumulative amplitude distribution of data elements in the test signal data set is identified in order by amplitude values. The data elements comprise frequency values and corresponding amplitude values. A subset of data elements from the test signal data set is identified. The subset of data elements comprises the data elements with the amplitude values greater than a first threshold value. The data elements in the subset of data elements wherein a difference between the amplitude values of adjacent data elements in the cumulative amplitude distribution of data elements is greater than a second threshold value are then identified.

Another illustrative embodiment provides a method for identifying ambient signal data in a test signal data set. A cumulative amplitude distribution of data elements in the test signal data set is identified in order by amplitude values. The data elements comprise frequency values and corresponding amplitude values. A subset of data elements from the test signal data set is identified. The subset of data elements comprises the data elements with the amplitude values greater than a mean of the amplitude values of the data elements in the test signal data set. The data elements in the subset of data elements are identified wherein a difference between the amplitude values of adjacent data elements in the cumulative amplitude distribution of data elements is greater than a standard deviation of the amplitude values of the data elements in the subset of data elements.

Another illustrative embodiment provides an apparatus comprising an ambient signal identifier. The ambient signal identifier is configured to identify a cumulative amplitude distribution of data elements in a test signal data set in order by amplitude values. The data elements comprise frequency values and corresponding amplitude values. The ambient signal identifier is further configured to identify a subset of data elements from the test signal data set. The subset of data elements comprises the data elements with the amplitude values greater than a first threshold value. The ambient signal identifier is further configured to identify the data elements in the subset of data elements wherein a difference between the amplitude values of adjacent data elements in the cumulative amplitude distribution of data elements is greater than a second threshold value.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

FIG. 7 is an illustration of a data processing system in accordance with an illustrative embodiment.

DETAILED DESCRIPTION

The different illustrative embodiments recognize and take into account a number of different considerations. "A number", as used herein with reference to items, means one or more items. For example, "a number of different considerations" means one or more different considerations.

The different illustrative embodiments recognize and take into account that the current solution to reducing the effect of ambient emissions on interference path loss measurements and other tests involving transmitting and receiving of test signals involves conducting the measurement or other test in a location or under conditions in which ambient emissions are reduced. To conduct an interference path loss measurement on an aircraft, this solution may entail relocating the aircraft under test, along with the required test equipment and personnel, to a location where ambient radio frequency emissions are known to be reduced. Typically, such locations are relatively remote. Costs associated with having an aircraft dedicated to a remote location, fuel for moving the aircraft to the remote location and back, the flight test crew, the ground crew, engineering crew, local facility support, food, transport, and hotels result in a great amount of expense associated with conducting the interference path loss measurement at a remote location.

Illustrative embodiments provide a method and apparatus for analyzing a test signal data set in a manner that differentiates between an intentional test signal and signals resulting from ambient emissions. Illustrative embodiments, therefore, allow accurate interference path loss measurements and other tests to be conducted without requiring relocation of an aircraft or other system under test to a remote location.

Figure 1:
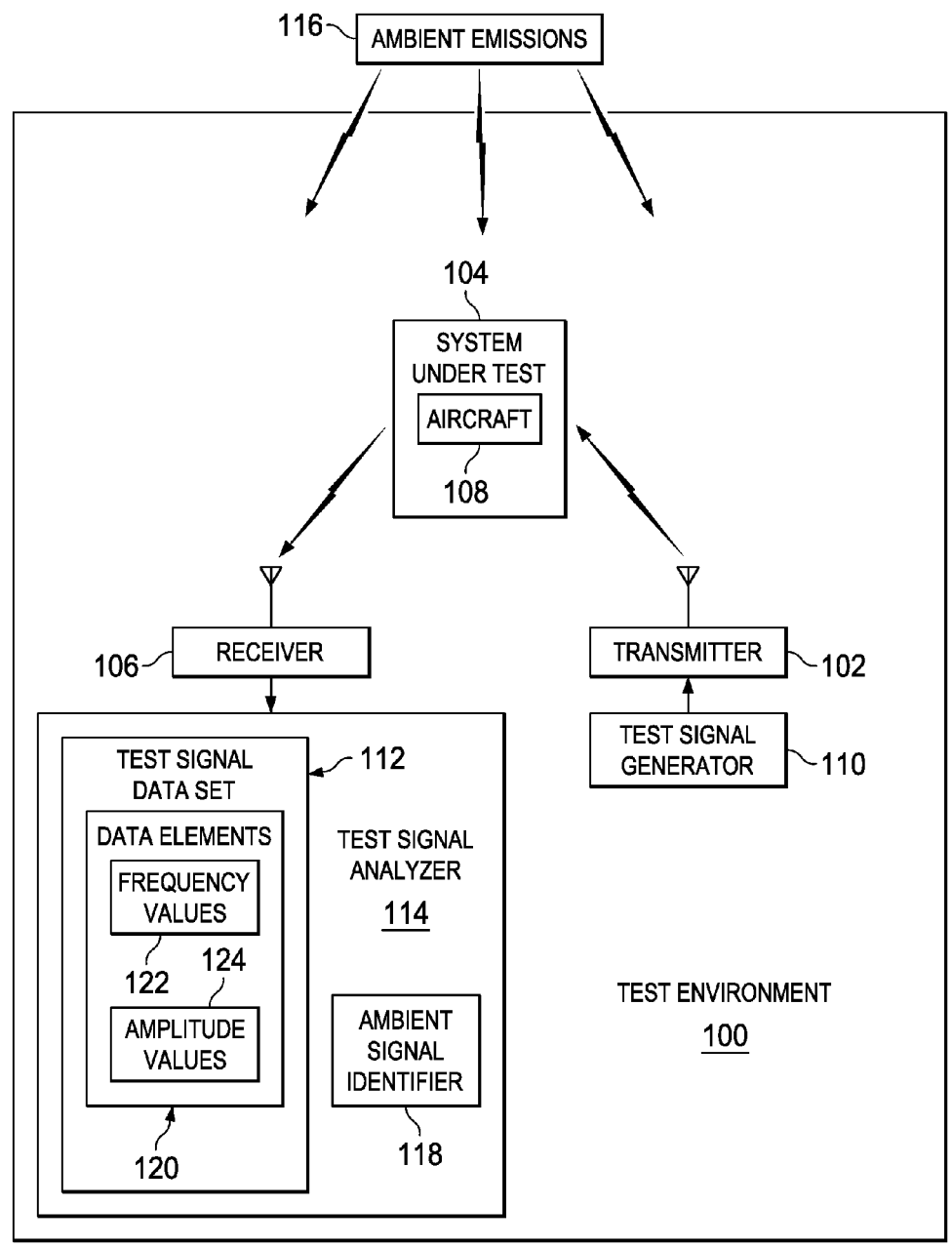
FIG. 1 is an illustration of a block diagram of a test environment in accordance with an illustrative embodiment.

Turning first to FIG. 1, an illustration of a block diagram of a test environment is depicted in accordance with an illustrative embodiment. In this example, test environment 100 includes transmitter 102, system under test 104, and receiver 106.

A test may be performed in test environment 100 by transmitting a test signal from transmitter 102. The transmitted test signal is received by receiver 106. The test signal received by receiver 106 may be analyzed to determine the effect of system under test 104 on the signal transmitted between transmitter 102 and receiver 106.

For example, without limitation, system under test 104 may be aircraft 108 or a part of aircraft 108. Aircraft 108 may include any type of fixed wing, rotary wing, or lighter-than-air aircraft. In other illustrative embodiments, system under test 104 may be another type of vehicle. For example, without limitation, system under test 104 may include any vehicle capable of traveling through the air, in space, on land, or on or under water. As other examples, system under test 104 may include other mobile or non-mobile platforms or structures, or portions thereof.

The test signal transmitted by transmitter 102 may be generated by test signal generator 110. The characteristics of the test signal generated by test signal generator 110 may depend on the particular test to be conducted in test environment 100.

The test signal received by receiver 106 may be provided in the form of test signal data set 112 to test signal analyzer 114.

For example, without limitation, test signal data set 112 may comprise data elements 120. Data elements 120 may comprise frequency values 122 and corresponding amplitude values 124. Data elements 120 may be represented in any appropriate form in test signal data set 112.

For example, without limitation, test signal analyzer 114 may be implemented as a computer or other data processing system that is programmed to analyze test signal data set 112 in a desired manner. The particular analysis of test signal data set 112 to be performed by test signal analyzer 114 may depend on the particular tests to be performed in test environment 100 for any particular application.

Ambient emissions 116 may include various radio frequency emissions or other emissions that originate from a source other than transmitter 102. For example, without limitation, ambient emissions 116 may include various terrestrial radio frequency emissions, radio frequency transmissions resulting from natural phenomena, or other emissions that may result in signals that are picked up by receiver 106. Thus, ambient emissions 116 may be received by receiver 106 along with the test signal transmitted by transmitter 102. As a result, ambient emissions 116 may result in ambient signal data being included in test signal data set 112. The presence of ambient signal data in test signal data set 112 may affect the analysis of test signal data set 112 by test signal analyzer 114 in undesired ways.

In accordance with an illustrative embodiment, test signal analyzer 114 preferably also includes ambient signal identifier 118. Ambient signal identifier 118 may process test signal data set 112 to identify ambient signal data in test signal data set 112. The identified ambient signal data may then be removed from test signal data set 112 before test signal data set 112 is analyzed by test signal analyzer 114. In this manner, an accurate analysis of test signal data set 112 may be obtained by test signal analyzer 114 for a test conducted in the presence of ambient emissions 116.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
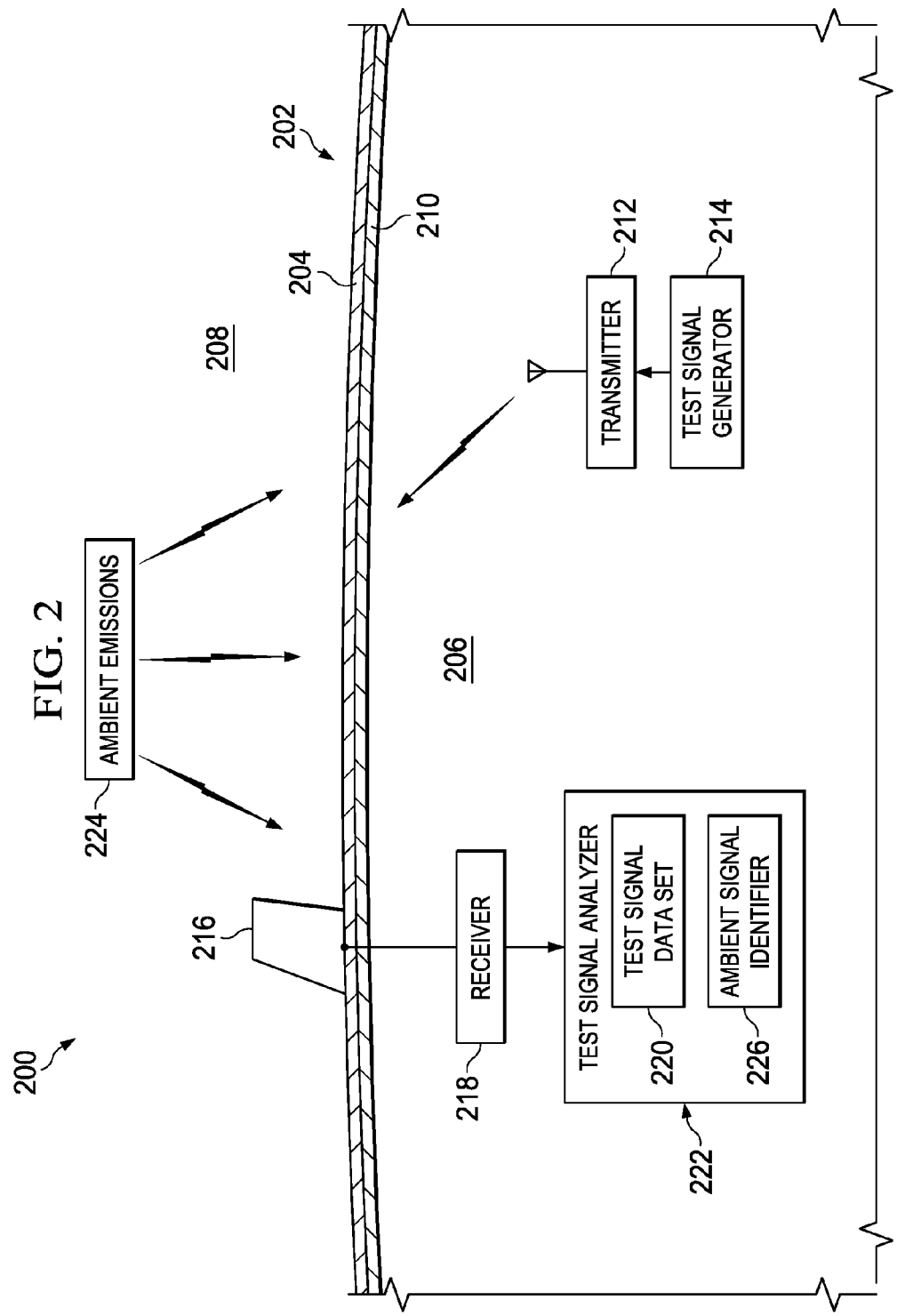
FIG. 2 is an illustration of a block diagram of a test environment for performing interference path loss testing in accordance with an illustrative embodiment.

Turning now to FIG. 2, an illustration of a block diagram of a test environment for performing interference path loss testing is depicted in accordance with an illustrative embodiment. In this example, test environment 200 is an example of test environment 100 in FIG. 1.

In this example, test environment 200 is a test environment for performing interference path loss testing on aircraft 202. A portion of fuselage 204 of aircraft 202 is shown. Cabin 206 is the interior area or portion of aircraft 202 inside fuselage 204. Exterior 208 is the area outside of aircraft 202. For example, without limitation, fuselage 204 may include material 210 for attenuating radio frequency signals between cabin 206 and exterior 208 via fuselage 204.

In this example, transmitter 212 and test signal generator 214 may be located in cabin 206 of aircraft 202. Test signal generator 214 generates a test signal that is transmitted by transmitter 212. In this example, test signal generator 214 generates a test signal for performing interference path loss measurement.

Aircraft antenna 216 may be mounted on fuselage 204 on exterior 208 of aircraft 202. Alternatively, aircraft antenna 216 may be mounted on interior 206 of aircraft 202. Aircraft antenna 216 may be connected to receiver 218 located in cabin 206 of aircraft 202. Receiver 218 may receive a portion of the test signal transmitted by transmitter 212. In this example, the radio frequency signal transmitted by transmitter 212 is subject to a number of electromagnetic parameters that result in the measurement of semi-random radio amplitude data over a given band of discrete frequencies.

The test signal received at receiver 218 may be provided as test signal data set 220 to test signal analyzer 222. While the measured data may vary in amplitude, test signal data set 220 may include data taken over a range of frequencies that conforms to the central limit theorem. The central limit theorem states that a large number of frequency-independent, random measurements, each with finite mean and variance, will be approximately normally distributed. The normal distribution can be arranged as a cumulative distribution in which the measured signals are arranged from the least to the greatest in amplitude.

Electromagnetic parameters related to aircraft 202 may result in unique variations in the measured data, which results in amplitudes that lay within or are greater than three standard deviations from the mean amplitude of test signal data set 220. This often occurs for low amplitude data, where a number of discrete measurements typically lay outside of three standard deviations about the mean. High amplitude signals can also exist outside of the three standard deviation limit due to electromagnetic resonance that results in optimal radio frequency coupling between transmitter 212 and receiver 218. It is higher amplitude signals that represent the most conservative result that may be reported for interference path loss measurement. For example, the higher frequency signals may indicate the least amount of path loss or the least amount of effectiveness of material 210 for alternating radio frequency signals.

Ambient emissions 224 may originate from exterior 208 of aircraft 202. Ambient emissions 224 may result in radio frequency signals that are received via aircraft antenna 216 and receiver 218 and that are included in test signal data set 220.

Ambient emissions 224 may become a significant factor within test signal data set 220 when ambient emissions 224 occur at the same frequency, at the same moment in time, and at a greater amplitude than the intentional test signal transmitted by transmitter 212. Very large amplitude ambient signals can be easily identified as being ambient when the test signal received by receiver 218 is many magnitudes greater than the signal transmitted by transmitter 212. However, it is more difficult to differentiate between an optimally coupled radio frequency test signal and radio frequency ambient emissions having similar amplitudes. Ambient emissions 224 may be measured in the interference path loss measurement performed by test signal analyzer 222 on test signal data set 220. Thus, ambient emissions 224 could suggest a lack of sufficient margin or inadequate shielding of fuselage 204.

In accordance with an illustrative embodiment, test signal analyzer 222 includes ambient signal identifier 226. Ambient signal identifier 226 is able to differentiate between the intentional test signal transmitted by transmitter 212 and ambient emissions 224.

Figure 3:
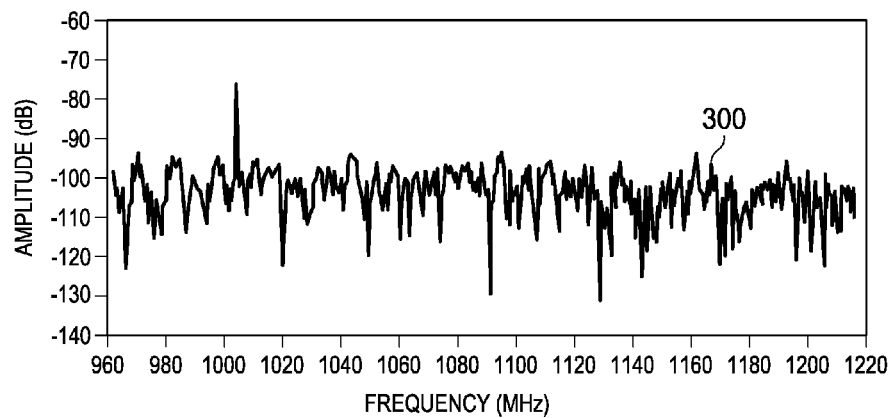
FIG. 3 is an illustration of example measured test data in accordance with an illustrative embodiment.
Figure 4:
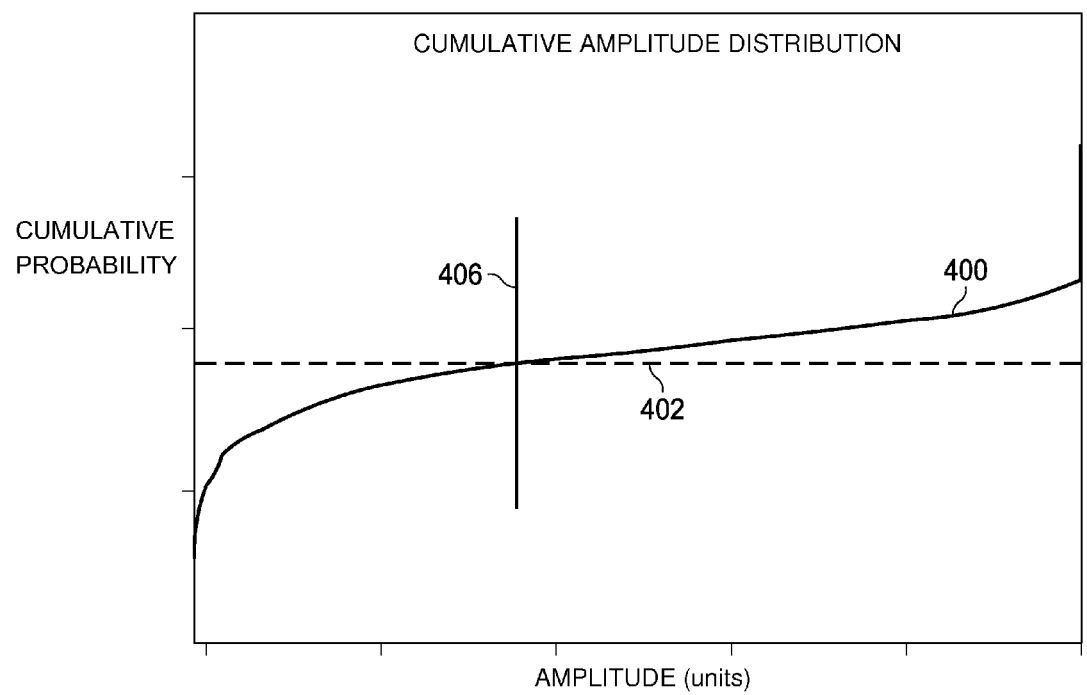
FIG. 4 is an illustration of an example cumulative distribution of measured test data in accordance with an illustrative embodiment.
Figure 5:
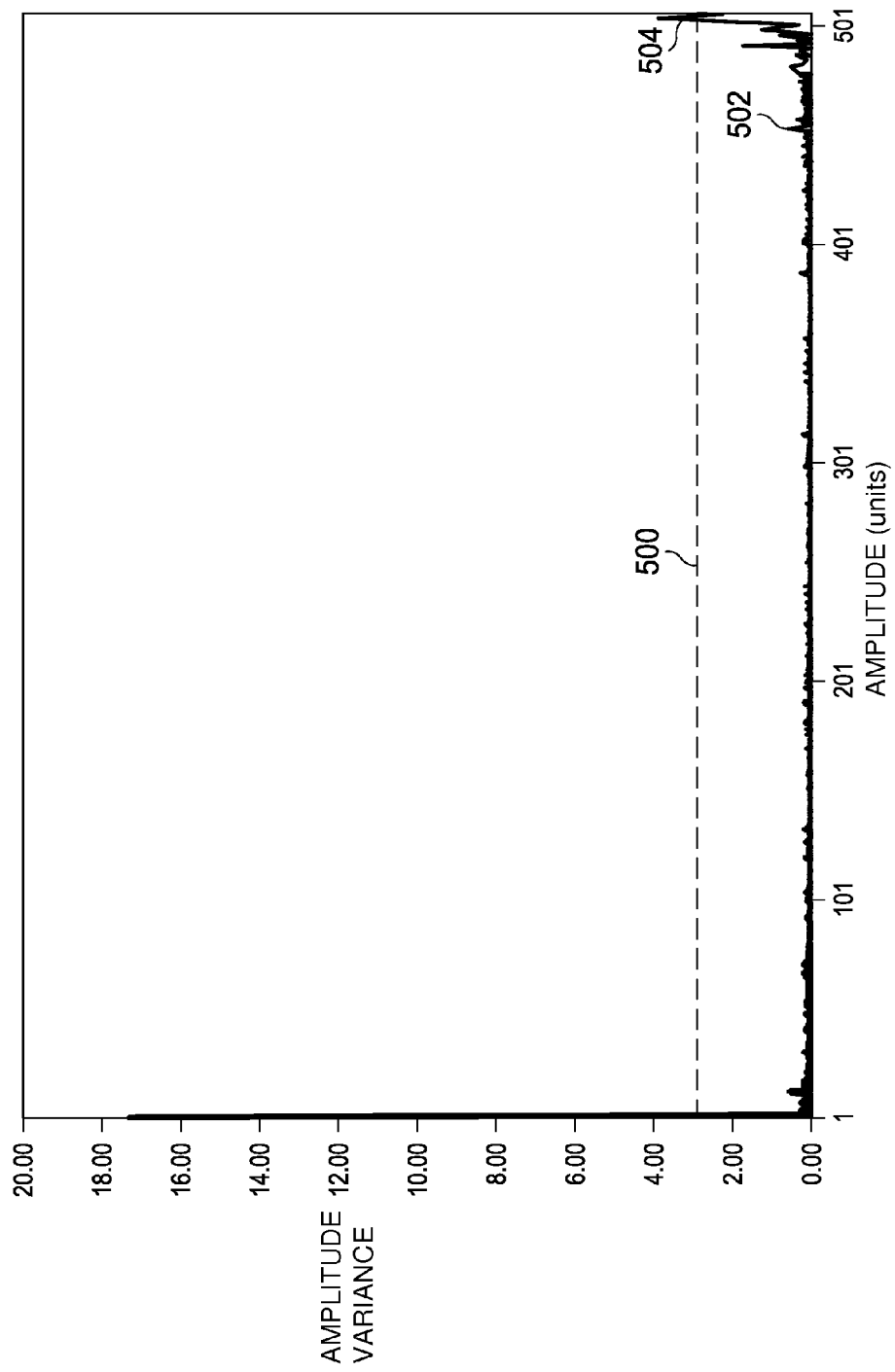
FIG. 5 is an illustration of an example variance of measured test data in accordance with an illustrative embodiment.

An example of ambient signal identification in accordance with an illustrative embodiment will be described with reference to FIGS. 3-5. FIGS. 3-5 illustrate an example test signal data set during various stages of processing of the data set to perform ambient signal identification.

Turning now to FIG. 3, an illustration of an example of measured test data is depicted in accordance with an illustrative embodiment. Test data 300 includes data showing signal amplitudes over a range of frequencies. In this example, test data 300 includes signal data resulting from intentionally transmitted test signals, as well as data resulting from one or more ambient emissions.

Turning now to FIG. 4, an illustration of an example of cumulative distribution of measured test data is depicted in accordance with an illustrative embodiment. FIG. 4 shows, at line 400, an arrangement of test data 300 in FIG. 3 as a cumulative amplitude distribution. Dashed line 402 identifies the mean amplitude for the entire data set. In accordance with an illustrative embodiment, the standard deviation of the entire data set also is identified.

From the cumulative distribution indicated by line 400, a subset of data including all amplitudes greater than the mean for the entire data set indicated by dashed line 402 is created. In this example, the subset of data includes data for all amplitudes to the right of line 406.

Turning now to FIG. 5, an illustration of an example of variance of measured test data is depicted in accordance with an illustrative embodiment. In accordance with an illustrative embodiment, the standard deviation of the subset of data is identified. In this example, the standard deviation of the subset of data identified in FIG. 4 is identified by dashed line 500 in FIG. 5.

An amplitude variance for adjacent cumulative distributed measurements within the subset of data is then identified. In this example, the resulting amplitude variance for adjacent cumulative distributed measurements within the subset of data is illustrated at line 502, along the bottom of FIG. 5. Ambient signals in the data set may then be identified as frequencies wherein the identified amplitude variance between discrete frequency measurements exceeds the standard deviation of the subset identified by dashed line 500.

Thus, in this example, data corresponding to line portion 504 that extends above dashed line 500 may be identified as data corresponding to ambient signals. In accordance with an illustrative embodiment, this data may be removed from the data set before the data set is analyzed to perform an interference path loss value measurement or other test.

Figure 6:
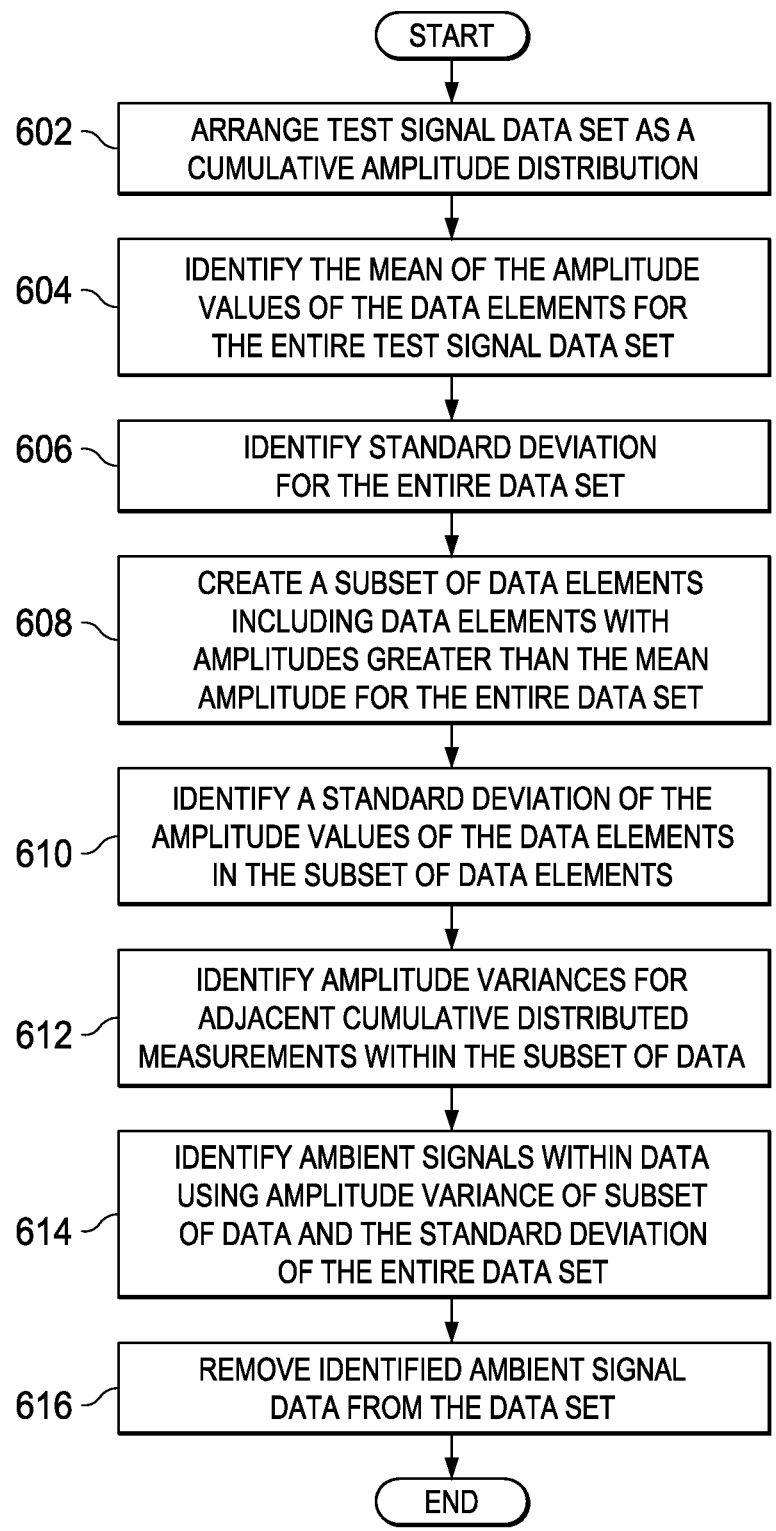
FIG. 6 is an illustration of a flowchart of a process for identifying ambient signals in test signal data in accordance with an illustrative embodiment.

Turning now to FIG. 6, an illustration of a flowchart of a process for identifying ambient signals in test signal data is depicted in accordance with an illustrative embodiment. The process in FIG. 6 may be implemented, for example, in ambient signal identifier 118 in FIG. 1 or ambient signal identifier 226 in FIG. 2.

The process begins by arranging the test signal data set as a cumulative amplitude distribution (operation 602). The mean of the amplitude values of the data elements for the entire test signal data set is identified (operation 604). The mean of the amplitude values of the data elements for the test signal data set is an example of a first threshold value. A standard deviation for the entire data set may be identified (operation 606).

A subset of the data elements including data elements with amplitudes greater than the mean amplitude for the entire data set is then created (operation 608). A standard deviation of the amplitude values of the data elements in the subset of data elements is identified (operation 610). The standard deviation of the amplitude values of the data elements in the subset of data elements is an example of a second threshold value. Amplitude variances for adjacent cumulative distributed measurements within the subset of data are identified (operation 612).

Ambient signals within the data are then identified using the amplitude variance of the subset of data, the standard deviation of the subset of data and the standard deviation of the entire data set (operation 614). For example, operation 614 may include identifying ambient signal data in the data set as data wherein the amplitude variance between discrete frequency measurements exceeds the standard deviation of the subset or if the identified discrete measurements exceed three standard deviations of the entire data set. The identified ambient signal data may then be removed from the data set (operation 616), with the process terminating thereafter.

Turning now to FIG. 7, an illustration of a data processing system is depicted in accordance with an illustrative embodiment. In this example, data processing system 700 is an example of one implementation of a data processing system for implementing test signal analyzer 114 in FIG. 1 and test signal analyzer 222 in FIG. 2. In this illustrative example, data processing system 700 includes communications fabric 702. Communications fabric 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or nonvolatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying ambient signal data in a test signal data set, the method comprising:
   identifying, via a number of processors, a cumulative amplitude distribution of data elements in the test signal data set wherein the data elements are in order by amplitude values, wherein the data elements comprise frequency values and corresponding amplitude values;
   identifying a subset of data elements from the test signal data set, wherein the subset of data elements comprises the data elements with the amplitude values greater than a first threshold value;
   identifying the data elements in the subset of data elements wherein a difference between the amplitude values of adjacent data elements in the cumulative amplitude distribution of data elements is greater than a second threshold value; and
   using the test signal data set to perform an interference path loss measurement for an aircraft after removing from the test signal data set the data elements identified by identifying the data elements in the subset of data elements.

2. The method of claim 1, wherein the first threshold value is a mean of the amplitude values of the data elements in the test signal data set.

3. The method of claim 1, wherein the second threshold value is a standard deviation of the amplitude values of the data elements in the subset of data elements.

4. The method of claim 3 further comprising identifying the data elements in the subset of data elements wherein the difference between the amplitude values of the adjacent data elements in the cumulative amplitude distribution of data elements is greater than a multiple of the standard deviation of the amplitude values of the data elements in the test signal data set.

5. The method of claim 1 further comprising removing from the test signal data set the data elements identified by identifying the data elements in the subset of data elements.

6. The method of claim 1 further comprising:
   transmitting a test signal; and
   receiving a signal responsive to the test signal, wherein the test signal data set is derived from the signal received responsive to the test signal.

7. The method of claim 6, wherein the signal received responsive to the test signal includes ambient emissions and wherein the data elements identified by identifying the data elements in the subset of data elements correspond to the ambient emissions.

8. A method for identifying ambient signal data in a test signal data set, the method comprising:
   identifying, via a number of processors, a cumulative amplitude distribution of data elements in the test signal data set wherein the data elements are in order by amplitude values, wherein the data elements comprise frequency values and corresponding amplitude values;
   identifying a subset of data elements from the test signal data set, wherein the subset of data elements comprises the data elements with the amplitude values greater than a mean of the amplitude values of the data elements in the test signal data set;
   identifying the data elements in the subset of data elements wherein a difference between the amplitude values of adjacent data elements in the cumulative amplitude distribution of data elements is greater than a standard deviation of the amplitude values of the data elements in the subset of data elements; and
   using the test signal data set to perform an interference path loss measurement for an aircraft after removing from the test signal data set the data elements identified by identifying the data elements in the subset of data elements.

9. The method of claim 8 further comprising identifying the data elements in the subset of data elements wherein the difference between the amplitude values of the adjacent data elements in the cumulative amplitude distribution of data elements is greater than a multiple of the standard deviation of the amplitude values of the data elements in the test signal data set.

10. The method of claim 8 further comprising removing from the test signal data set the data elements identified by identifying the data elements in the subset of data elements.

11. The method of claim 8 further comprising:
transmitting a test signal; and
receiving a signal responsive to the test signal, wherein the test signal data set is derived from the signal received responsive to the test signal.

12. The method of claim 11, wherein the signal received responsive to the test signal includes ambient emissions and wherein the data elements identified by identifying the data elements in the subset of data elements correspond to the ambient emissions.

13. An apparatus comprising:
an ambient signal identifier configured to:
identify a cumulative amplitude distribution of data elements in a test signal data set wherein the data elements are in order by amplitude values, wherein the data elements comprise frequency values and corresponding amplitude values;
identify a subset of data elements from the test signal data set, wherein the subset of data elements comprises the data elements with the amplitude values greater than a first threshold value; and
identify the data elements in the subset of data elements wherein a difference between the amplitude values of adjacent data elements in the cumulative amplitude distribution of data elements is greater than a second threshold value; and
a test signal analyzer configured to:
use the test signal data set to perform an interference path loss measurement for an aircraft after the data elements identified in the subset of data elements are removed from the test signal data set.

14. The apparatus of claim 13, wherein the first threshold value is a mean of the amplitude values of the data elements in the test signal data set.

15. The apparatus of claim 13, wherein the second threshold value is a standard deviation of the amplitude values of the data elements in the subset of data elements.

16. The apparatus of claim 13, wherein the ambient signal identifier is further configured to remove from the test signal data set the data elements identified in the subset of data elements.

17. The apparatus of claim 13 further comprising:
a transmitter configured to transmit a test signal; and
a receiver configured to receive a signal responsive to the test signal, wherein the signal received responsive to the test signal includes ambient emissions, wherein the test signal data set is derived from the signal received responsive to the test signal, and wherein the data elements identified in the subset of data elements correspond to the ambient emissions.

\* \* \* \* \*